Figure 1:
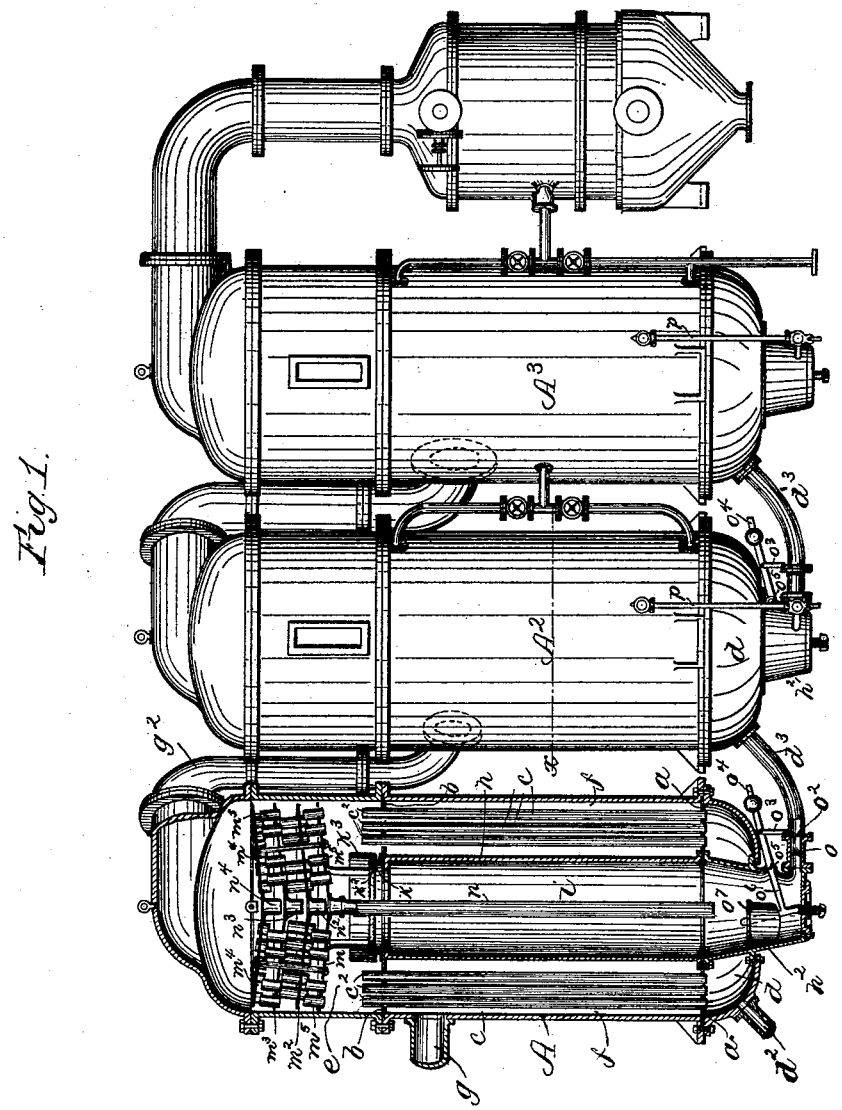

(No Model.)  2 Sheets—Sheet 1.

O. B. STILLMAN.
EVAPORATING APPARATUS.

No. 484,831. Patented Oct. 25, 1892.

Witnesses
Jas. J. Maloney.
M. E. Hef.

Inventor,
Oscar B. Stillman.
by Jno. P. Dinmore
Att'y.

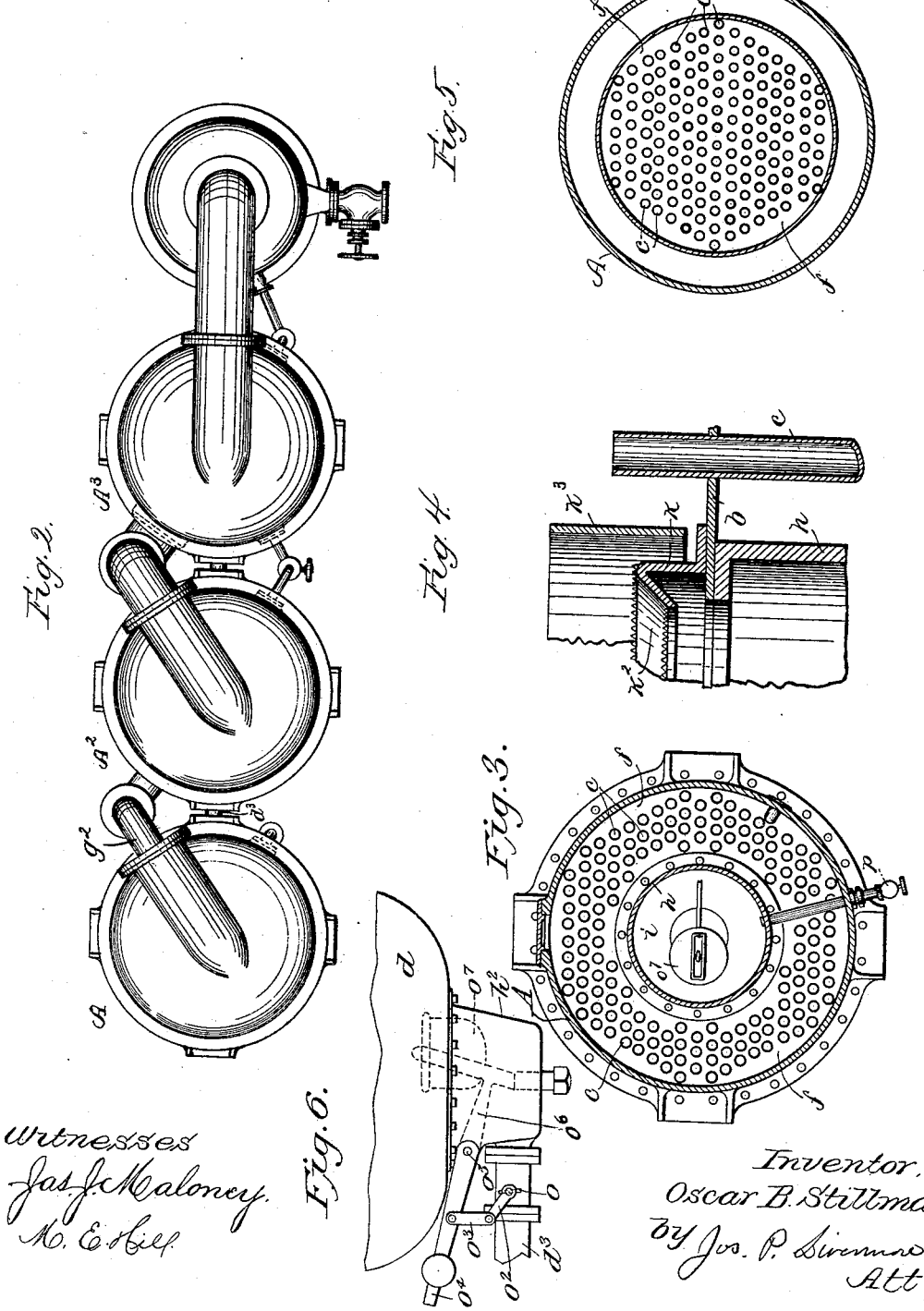

UNITED STATES PATENT OFFICE.

OSCAR B. STILLMAN, OF NATICK, MASSACHUSETTS.

EVAPORATING APPARATUS.

SPECIFICATION forming part of Letters Patent No. 484,831, dated October 25, 1892.

Application filed April 25, 1892. Serial No. 430,582. (No model.)

*To all whom it may concern:*

Be it known that I, OSCAR B. STILLMAN, of Natick, county of Middlesex, State of Massachusetts, have invented an Improvement in Evaporating Apparatus, of which the following description, in connection with the accompanying drawings, is a specification, like letters on the drawings representing like parts.

My invention relates to an evaporating apparatus of the kind known as the "multiple-effect apparatus," in which a series of closed vessels is employed and the vapor given off from the liquid to be evaporated or concentrated in one vessel is employed to heat the liquor in the next vessel, and so on.

The invention relates especially to the construction of the appliances used in each vessel, and is consequently independent of the number of vessels employed, the apparatus being shown, for the purposes of illustration, as containing a series of three vessels.

In apparatus of this kind as heretofore constructed the vessels have sometimes been made in the form of vertical cylinders divided by transverse partitions or sheets near the top and bottom, so as to partition off an intermediate chamber traversed by vertical tubes that connect the spaces below and above the said intermediate chamber. The space around the tubes in the intermediate chamber receives the vapor, the latent heat of which is employed to evaporate the liquid contained within and passing through the tubes, the said liquid being introduced into the space below the lower tube-sheet and passed up through the tubes to the space above the upper tube-sheet, in which upper space the vapor given off by the said liquid is collected and from which it is carried by a pipe to the vapor-space of the next vessel of the series, and so on. For convenience the intermediate chamber, in which the liquid in the tubes is subjected to the heat of the vapor surrounding the tubes, will be hereinafter called the "heating-chamber;" and the present invention consists, partly, in partitioning off from the said heating-chamber by a longitudinal partition a separate chamber extending lengthwise of the vessel, through which the liquid after passing through the tubes of the heating-chamber is permitted to fall, as will be hereinafter described. The partition that thus separates off a portion of the heating-chamber, forming what will be called a "collecting-passage," is shown as concentric with the walls of the vessel, and the collecting-passage is preferably at the middle of the vessel and surrounded by the heating-chamber, which is thus in the form of an annulus; but the relative arrangement might be modified—as, for example, by making the collecting-passage an annulus surrounding the heating-chamber or otherwise forming the collecting-passage inside the vessel. The lower portion of the said collecting-passage constitutes a collecting-chamber for the partially-concentrated liquid, said chamber extending below and outside of the main body of the vessel and communicating with the liquid-receiving space of the next vessel of the series, and means are provided for controlling the flow of liquid from the lower portion of the collecting-passage of one vessel into the liquid-receiving space of the next vessel.

The invention further consists in providing the tubes through which the liquid passes with extensions above the upper tube-sheet, so that the liquid passing up through the said tubes and delivered from the upper end thereof will descend onto the upper surface of the tube-sheet, where it will stand at a certain depth before flowing over into the collecting-passage, the said depth, however, being less than the upward extent of the tubes, so that the ends of the latter will always be uncovered by the liquid.

The invention consists, further, in a separating apparatus, to be described, herein shown as contained in the vapor-space above the upper tube-sheet, although it might be located in the vapor-pipe connecting the vapor-chamber in the top of one vessel with the vapor-space in the heating-chamber of the next vessel.

Figure 1 is a side elevation of an evaporating apparatus embodying this invention, one of the vessels being shown in longitudinal section; Fig. 2, a plan view thereof; Fig. 3, a transverse section on line $x$, Fig. 1, of one of the vessels on a larger scale; Fig. 4, an enlarged detail showing the construction of the distributer; Fig. 5, a modification in the arrangement of the return-passage, and Fig. 6 a side elevation of the lower portion of one of the evaporating-vessels as seen from the opposite side to that represented in Fig. 1 and on a larger scale.

The general arrangement of the apparatus may be as usual, the said apparatus comprising a number of vessels $A$ $A^2$ $A^3$, arranged in series and connected, so that the vapor given off by the liquid being evaporated or concentrated in one vessel is employed to heat the liquid to be evaporated in the next vessel, and so on. Each of said vessels is provided with transverse partitions or tube-sheets $a$ $b$, (see Fig. 1,) the space between which is traversed by a number of tubes $c$, which thus connect the space or chamber $d$ below the tube-sheet $a$ with the space $e$ above the upper tube-sheet $b$.

The space $f$ between the sheets $a$ and $b$, that is traversed by the tubes $c$, constitutes the heating-chamber, the said space receiving steam or vapor, which in condensing gives off its latent heat to the liquid in the tubes $c$, heating them and evaporating their contents. Exhaust-steam is usually employed in the heating-chamber $f$ of the first vessel of the series, being introduced thereto through a pipe $g$. The space below the upper tube-sheet $b$ is divided by a longitudinal partition $h$, thus separating off a space or collecting-passage $i$ from the said chamber, said partition $h$ being continued, as shown at $h^2$, through the lower chamber $d$ and below the bottom thereof, and the passage $i$ thus formed being closed at its lower end, preferably by a removable cap or bonnet, so that the lower end of the passage constitutes a collecting-chamber for the unvaporized portion of the liquid.

As shown in Fig. 1, the collecting-passage $i$ is contained within the heating-chamber $f$, which is usually the best arrangement; but if for any reason it is desirable the collecting passage $i$ might be made in the form of an annulus, as shown in Fig. 5, surrounding the heating-chamber $f$, or any other convenient or desirable arrangement might be adopted.

Around the upper end of the collecting-passage is a distributer, shown as a rib or flange $k$, projecting upward from the tube-sheet $b$ and provided with an inclined flange $k^2$, overhanging the space in the collecting-passage $i$ and notched or corrugated, preferably, at its upper and lower edges, as shown in Fig. 4, so that the liquid on the tube-sheet $b$ when rising above the upper edge of the rib $k$ will flow down over the flange $k^2$ and will be broken up and delivered in the form of a shower, which will fall through the collecting-passage $i$, thus affording an opportunity for the vapor to part from the heated liquid.

The tubes $c$ are provided with upward extensions $c^2$ above the tube-sheet $b$ and above the level of the rib $k$, so that the liquid rising from the said tubes and being delivered from the upper end thereof in a state of ebullition or in partially-vaporized condition will descend onto the sheet $b$ and thence be delivered over the distributer $k$ $k^2$ into the collecting-passage, as described, the upper ends of the tubes thus projecting above the level of the liquid on the tube-sheet $b$ and being always uncovered.

The object of this construction of the tubes is as follows: When the apparatus is in operation, the liquid which is introduced to the tubes of the lower end and carried upward progressively therethrough is brought to a state of ebullition in the tubes, the lower portions only of which are thus filled with the liquid, while the upper portions are filled with vapor and spray resulting from the ebullition of the liquid, which vapor and spray are delivered in jets from the upper ends of the tubes, the more-thoroughly vaporized parts rising, while the unvaporized portion falls back onto the tube-sheet $b$ around the tube. If the tubes were flush with the tube-sheet, portions of the uncondensed liquid would flow back into the tubes, thus raising the level of the liquid in the tubes, increasing the pressure thereon, and diminishing the ebullition; but by having the tubes extend above the level to which the liquid can accumulate on the tube-sheet $b$, as shown, such backflow of liquid into the tubes is prevented. It is obvious that this feature of construction and operation does not depend upon the form of collecting-passage, and the invention so far as this feature is concerned is not limited to any specific construction of the means by which the liquid delivered from the tubes onto the upper tube-sheet is removed therefrom to be conveyed to the next vessel or otherwise disposed of.

The liquid to be evaporated or condensed is introduced into the chamber $d$ in any usual way through a suitable inlet-passage (indicated at $d^2$) and rises through the tubes $c$ in the heating-chamber, and is thereby heated by the surrounding hot vapor in the vapor-chamber $f$, and finally issues from the upper ends of the said tubes, the unvaporized portion thereof descending onto the plate $b$ and being delivered therefrom over the distributer $k$, as has been described.

In order to prevent irregularity in the flow of the liquid over the distributer $k$ $k^2$ by the disturbance from the liquid issuing from the tubes $c^2$, a shield or apron $k^3$ is provided, surrounding the rib $k$, as shown, and extending above and below the level at which the liquid would naturally stand on the sheet $b$ when flowing over the distributer $k$ $k^2$. This portion of the invention is not limited to an apparatus in which the tubes are upwardly extended, as before described, since it is obvious that the shield and distributer should perform their functions in substantially the same way whatever might be the construction or arrangement of the tubes by which the liquid is delivered onto the tube-sheet, it being essential only that the said shield should be interposed between the distributer and the delivery-orifices of the tubes, so as to prevent the agitation or ebullition at the latter point from disturbing the even flow of liquid over the distributer. The liquid thus heated in the tubes $c$ and in its fall through the collecting-passage $i$ gives off a large amount of vapor, which passes into the chamber $e$ and thence through the pipe $g^2$ into the vapor-space of the heating-chamber of the next vessel of the series, and in its passage from one vessel to the next the vapor is subjected to the action of a separating apparatus (shown in this instance as contained in the vapor-chamber $e$) in the top of the vessel in which the said vapor is generated. The said separator consists of a series of plates or transverse partitions $m\ m^2\ m^3\ m^4$, &c., each of which is provided with numerous perforations containing short tubes $m^5$, projecting some distance above the said plates, the tubes in one plate being out of line with those in the next plate, so that the vapor that passes through the tubes in one plate has to take a devious course in arriving at the tubes of the next plate through which it has to pass on its way to the next vessel. These plates cause the vapor to be subdivided and to impinge against the succeeding plates in such a way as to throw down any liquid or matter other than the vapor or entrained in the vapor, so that finally nothing but the vapor arrives at and passes through the pipe $g^2$, leading to the next vessel. When the separator-plates $m$ $m^2\ m^3$ are arranged in the vapor-chamber $e$, as shown, they are somewhat inclined, as shown, downward from the outer walls toward the axis of the vessel and at the lowest point are provided with return-pipes $n\ n^2\ n^3\ n^4$, arranged so that each receives the liquid from the one above it, so that the entire liquid or material separated from the vapor is returned through the pipe $n$ to the bottom of the collecting-passage $i$, together with the liquid that overflows the distributer $k\ k^2$ from the tubes $c$. The said partially-concentrated liquid which has been acted upon and evaporated to a certain extent in the first vessel thus accumulates in the lower part of the collecting-passage $i$, which is connected by a pipe $d^3$ with the liquid-receiving chamber $d$ of the next vessel of the series, so that the partially-concentrated liquid that has been acted upon in one vessel may be conveyed to the next vessel to be acted upon therein by the vapor which has been evaporated from it in the first vessel.

Suitable means are provided for controlling the flow of the liquid through the pipe $d^3$ from one vessel to the next. As shown, in this instance the said pipe is provided with a butterfly-valve $o$, the operating-crank $o^2$ (see Fig. 6) of which is connected by a link $o^3$ with an arm $o^4$ on a rock-shaft or spindle $o^5$, extending into the collecting-chamber at the lower part of the collecting-passage and provided at the inside of said chamber with an arm $o^6$, connected with a float $o^7$, which when the liquid accumulates to a sufficient depth is raised, and thus opens the valve $o$ and permits the liquid to flow through the pipe $d^3$ to the next vessel, the said flow being due to the fact that each succeeding vessel is under lower pressure than the preceding ones.

The collecting-chamber at the lower part of the collecting-passage is shown as provided with a gage-glass $p$ to show the height at which the liquid stands in the said collecting-passage, the upper portion of which constitutes, substantially, a part of the vapor-chamber of the vessel, thus enabling the vapor-chamber $e$ to be reduced in size. The liquid-receiving chamber $d$ is formed between the lower tube-sheet $a$ and removable annular bonnet connected with the side shell of the vessel and the side wall $h^2$ of the lower part of the collecting-passage, as shown, so that said bonnet may be easily removed, thus affording access to the tubes, when necessary, for cleaning or repairing the apparatus, which is thus more easily kept in working order than in the constructions generally adopted in apparatus of this kind.

Except as hereinbefore described the several vessels may be of the usual construction and operated in the usual manner, being provided with the usual accessories for controlling the passage of the liquid and vapor for determining the level of the liquid and for testing the degree of condensation, &c., the vapor being taken from the last chamber of the series by a condenser or air-pump and the water of condensation being removed from the several heating-chambers by the usual means and in the usual manner, the said parts themselves forming no part of the present invention.

I claim—

1. In a multiple-effect evaporating apparatus, the main vessel containing the heating-chamber comprising a vapor-space and tubes in which the liquid to be evaporated is exposed to the heating effect of said vapor, combined with a collecting-passage contained within the vessel and adjacent to said heating-chamber, through which collecting-passage a portion of said liquid is caused to pass after traversing the tubes of the heating-chamber, and the collecting-chamber at the lower end of said collecting-passage and extending through and below the bottom of the main vessel, substantially as described.

2. In a multiple-effect evaporating apparatus, the vessel provided with a heating-chamber comprising a vapor-space and tubes in which the liquid to be evaporated is exposed to the heating effect of said vapor, combined with a collecting-passage extending from the space above the said heating-chamber to the lower part of the vessel and a distributer by which the liquid above the heating-chamber is delivered into the said collecting-passage in the form of a shower, substantially as described.

3. In a multiple-effect evaporating apparatus, the vessel provided with transverse tube-sheets and tubes connecting the space below the lower with the space above the upper tube-sheet, said tubes being provided with extensions above the upper tube-sheet, and a collecting-passage extending from the space above the upper tube-sheet and communicating with the liquid-receiving space of the next vessel, said collecting-passage having its mouth or inlet-opening at a lower level than the orifices of the extensions of the tubes above the upper tube-sheet, substantially as described.

4. In a multiple-effect evaporating apparatus, the vessel provided with transverse tube-sheets and tubes connecting the space below the lower with the space above the upper tube-sheet, a collecting-passage extending from the space above the upper tube-sheet to the lower part of the vessel, and a distributer at the upper end of said collecting-passage, the said tubes being provided with extensions above the upper tube-sheet and above the level of the liquid flowing over the distributer, substantially as described.

5. In a multiple-effect evaporating apparatus, the vessel provided with a heating-chamber comprising a vapor-space and tubes in which the liquid to be evaporated is exposed to the heating effect of said vapor, a collecting-passage extending from the space above the said heating-chamber to the lower part of the vessel, and a distributer at the upper end of said collecting-passage, and a shield or apron interposed between the said distributer and the delivery ends of said tubes, substantially as described.

6. In a multiple-effect evaporating apparatus, the vessel provided with a heating-chamber comprising a vapor-space and tubes in which the liquid to be evaporated is exposed to the heating effect of said vapor, a collecting-passage extending from the space above the said heating-chamber to the lower part of the vessel, and a distributer at the upper end of said collecting-passage, the said tubes being provided with extensions above the upper tube-sheet and above the level of the liquid flowing over the distributer, and a shield or apron interposed between the said distributer and the delivery ends of said tubes, substantially as described.

7. In a multiple-effect evaporating apparatus, the vessel provided with a heating-chamber comprising a vapor-space and tubes in which the liquid to be evaporated is exposed to the heating effect of said vapor, a collecting-passage extending from the space above the said chamber to the lower part of the vessel, and a duct connecting the lower part of the said collecting-passage with the liquid-receiving space of the next vessel of the series, and means for controlling the flow of liquid through said duct, substantially as described.

8. In a multiple-effect evaporating apparatus, the vessel provided with a heating-chamber comprising a vapor-space and tubes in which the liquid to be evaporated is exposed to the heating effect of said vapor, and a duct connecting the space above the said chamber with the space around the tubes in the heating-chamber of the next receptacle, forming the vapor-passage from one vessel to the next, combined with a series of perforated plates forming partitions through which the vapor must pass, the perforations of said plates being provided with tubes and said tubes of one plate being out of line with the tubes of the next plate, substantially as and for the purpose set forth.

9. The main vessel of a multiple-effect evaporating apparatus provided with transverse tube-sheets and tubes connecting the space below the lower with the space above the upper tube-sheet, a collecting-passage extending from the space above the upper tube-sheet to the lower tube-sheet, and a collecting-chamber $h^2$ at the lower end of said passage, extending below the lower tube-sheet, and a removable annular hood or bonnet extending from the outer wall of said collecting-chamber to the outer wall of the main vessel and inclosing the liquid-inlet chamber communicating with the lower ends of the tubes, substantially as described.

In testimony whereof I have signed my name to this specification in the presence of two subscribing witnesses.

OSCAR B. STILLMAN.

Witnesses:
AUGUSTIN FÜLLER,
JOSEPH J. ARREDONDO.